US012135798B2

(12) United States Patent
Holmes et al.

(10) Patent No.: US 12,135,798 B2
(45) Date of Patent: Nov. 5, 2024

(54) SECURE RESOLUTION OF EMAIL-BASED QUERIES INVOLVING CONFIDENTIAL THIRD-PARTY DATA

(71) Applicant: The Toronto-Dominion Bank, Toronto (CA)

(72) Inventors: Michael David Terrance Holmes, Toronto (CA); Adam Nicholas Klickermann, Ottawa (CA); Ashik Ali, Ottawa (CA); Michael James Taggart, Ottawa (CA)

(73) Assignee: The Toronto-Dominion Bank, Toronto (CA)

( * ) Notice: Subject to any disclaimer, the term of this patent is extended or adjusted under 35 U.S.C. 154(b) by 197 days.

(21) Appl. No.: 17/549,705

(22) Filed: Dec. 13, 2021

(65) Prior Publication Data

US 2022/0198028 A1   Jun. 23, 2022

Related U.S. Application Data

(60) Provisional application No. 63/126,646, filed on Dec. 17, 2020.

(51) Int. Cl.
| | |
|---|---|
| *G06F 21/60* | (2013.01) |
| *G06F 16/903* | (2019.01) |
| *G06F 21/62* | (2013.01) |
| *G06F 21/10* | (2013.01) |

(52) U.S. Cl.
CPC .......... *G06F 21/602* (2013.01); *G06F 16/903* (2019.01); *G06F 21/6227* (2013.01); *G06F 21/107* (2023.08); *G06F 2221/2115* (2013.01)

(58) Field of Classification Search
CPC .. G06F 21/602; G06F 16/903; G06F 21/6227; G06F 21/107; G06F 2221/2115
See application file for complete search history.

(56) References Cited

U.S. PATENT DOCUMENTS

| | | | |
|---|---|---|---|
| 7,333,615 B1 | 2/2008 | Jarboe | |
| 7,958,268 B2 | 6/2011 | Redlich et al. | |
| 8,090,953 B2 | 1/2012 | Tune | |
| 9,544,134 B2 | 1/2017 | Aissi et al. | |
| 10,038,675 B2 * | 7/2018 | Baudoin | H04L 63/061 |
| 10,581,818 B2 | 3/2020 | Manges | |
| 10,699,023 B1 | 6/2020 | Mokashi et al. | |
| 11,474,958 B1 * | 10/2022 | Dhuse | G06F 3/067 |

(Continued)

*Primary Examiner* — Meng Li
(74) *Attorney, Agent, or Firm* — Duane Morris LLP

(57) ABSTRACT

The disclosed embodiments include computer-implemented apparatuses and processes that resolve securely email-based queries involving confidential third-party data. For example, an apparatus may receive message data associated with an inquiry from a first computing system. The message data includes encrypted interlaced data, an identifier, and temporal data, and when a structure of the message data corresponds to an expected structure, the apparatus generates a decryption key based on at least one of the identifier or the temporal data, and decrypts the encrypted interlaced data using the decryption key. Based on a portion of the decrypted interlaced data, the apparatus requests and receives a response to the inquiry from a second computing system, and transmits at least a portion of the response to the first computing system, which presents the portion of the response within a digital interface.

20 Claims, 7 Drawing Sheets

(56) References Cited

U.S. PATENT DOCUMENTS

| | | | |
|---|---|---|---|
| 11,562,044 B1* | 1/2023 | Du | G06F 16/148 |
| 11,720,555 B1* | 8/2023 | Snyder | G06Q 30/0201 |
| | | | 707/609 |
| 11,863,552 B1* | 1/2024 | Rao | G06F 16/71 |
| 11,880,383 B2* | 1/2024 | Rauch | H04L 9/3236 |
| 11,882,222 B2* | 1/2024 | Ubbens | G06F 21/602 |
| 2015/0154589 A1* | 6/2015 | Li | G06F 21/44 |
| | | | 705/67 |
| 2016/0283744 A1* | 9/2016 | Dawson | G06F 16/22 |
| 2018/0032599 A1* | 2/2018 | Larsen | G06F 16/285 |
| 2018/0198602 A1 | 7/2018 | Duffy et al. | |
| 2018/0232732 A1* | 8/2018 | Rodrigues | G06Q 20/327 |
| 2019/0043281 A1* | 2/2019 | Aman | G07C 9/215 |
| 2019/0236284 A1 | 8/2019 | Hersans | |
| 2019/0244196 A1 | 8/2019 | John et al. | |
| 2020/0293543 A1* | 9/2020 | Lin | G06F 16/90335 |
| 2020/0327107 A1* | 10/2020 | Xu | G06F 16/248 |
| 2020/0334169 A1* | 10/2020 | Zhang | G06F 12/1458 |
| 2020/0349186 A1* | 11/2020 | Yang | G06F 3/0641 |
| 2021/0042743 A1* | 2/2021 | Green | G07F 19/211 |
| 2021/0076408 A1* | 3/2021 | Zhu | H04W 72/0446 |
| 2021/0103612 A1* | 4/2021 | Ra | H04L 67/01 |
| 2021/0240376 A1* | 8/2021 | Volkov | G06F 3/061 |
| 2022/0198028 A1* | 6/2022 | Holmes | G06F 21/6227 |

* cited by examiner

SECURE RESOLUTION OF EMAIL-BASED QUERIES INVOLVING CONFIDENTIAL THIRD-PARTY DATA

CROSS-REFERENCE TO RELATED APPLICATION

This application claims the benefit of priority to U.S. Provisional Patent Application No. 63/126,646, filed on Dec. 17, 2020, the entire disclosure of which is expressly incorporated herein by reference to its entirety.

TECHNICAL FIELD

The disclosed embodiments generally relate to computer-implemented systems and processes for resolving securely email-based queries involving confidential third-party data.

BACKGROUND

Financial institutions offer a wide variety of financial products and services through both digital channels, such as mobile applications or web-based digital portals, and through more traditional, branch-based interactions between customers and representatives of the financial institution. Although a financial institution may obtain elements of customer data that facilitates an application for a particular financial product, a third-party processor may process the elements of application data and complete the application process on behalf of the financial institution. Further, and upon successful completion of the application process, and the issuance of the particular financial product to the customer, the third-party processor may also perform operations, on behalf of the financial institution, that process payments, mediate disputes and impose fees, and that maintain elements of data characterizing the customer's payment and fee history.

SUMMARY

In some examples, an apparatus includes a communications interface, a memory storing instructions, and at least one processor coupled to the communications interface and to the memory. The at least one processor is configured to execute the instructions to receive, via the communications interface, message data associated with an inquiry from a first computing system. The message data includes encrypted interlaced data, an identifier, and temporal data. The at least one processor is configured to execute the instructions to, when a structure of the message data corresponds to an expected structure, perform operations that generate a decryption key based on at least one of the identifier or the temporal data, and that decrypt the encrypted interlaced data using the decryption key. The at least one processor is configured to execute the instructions to, based on a portion of the decrypted interlaced data, request and receive, via the communications interface, a response to the inquiry from a second computing system. The at least one processor is configured to execute the instructions to transmit, via the communications interface, at least a portion of the response to the first computing system. The first computing system is configured to present the portion of the response within a digital interface.

In other examples, a computer-implemented method includes receiving, using at least one processor, message data associated with an inquiry from a first computing system. The message data includes encrypted interlaced data, an identifier, and temporal data. The computer-implemented method includes, when a structure of the message data corresponds to an expected structure, performing operations, using the at least one processor, that generate a decryption key based on at least one of the identifier or the temporal data, and that decrypt the encrypted interlaced data using the decryption key. The computer-implemented method includes, based on a portion of the decrypted interlaced data, requesting and receiving, using the at least one processor, a response to the inquiry from a second computing system. The computer-implemented method includes transmitting, using the at least one processor, at least a portion of the response to the first computing system. The first computing system is configured to present the portion of the response within a digital interface.

Further, in some examples, an apparatus includes a communications interface, a memory storing instructions, and at least one processor coupled to the communications interface and to the memory. The at least one processor is configured to execute the instructions to obtain first data characterizing an inquiry, and, based on an index value associated with the first data, generate an encryption key and obtain second data associated with the index value. The at least one processor is configured to execute the instructions to encrypt interlaced data using the encryption key. The interlaced data includes at least a portion of the first data disposed within portions of the second data. The at least one processor is configured to execute the instructions to transmit, via the communications interface, structured message data that includes the encrypted interlaced data to a first computing system. The structured message data includes information that causes the first computing system to request and receive a response to the inquiry from a second computing system. The at least one processor is configured to execute the instructions to receive the response to the inquiry from the first computing system via the communications interface and performing operations that present at least a portion of the response within a digital interface.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
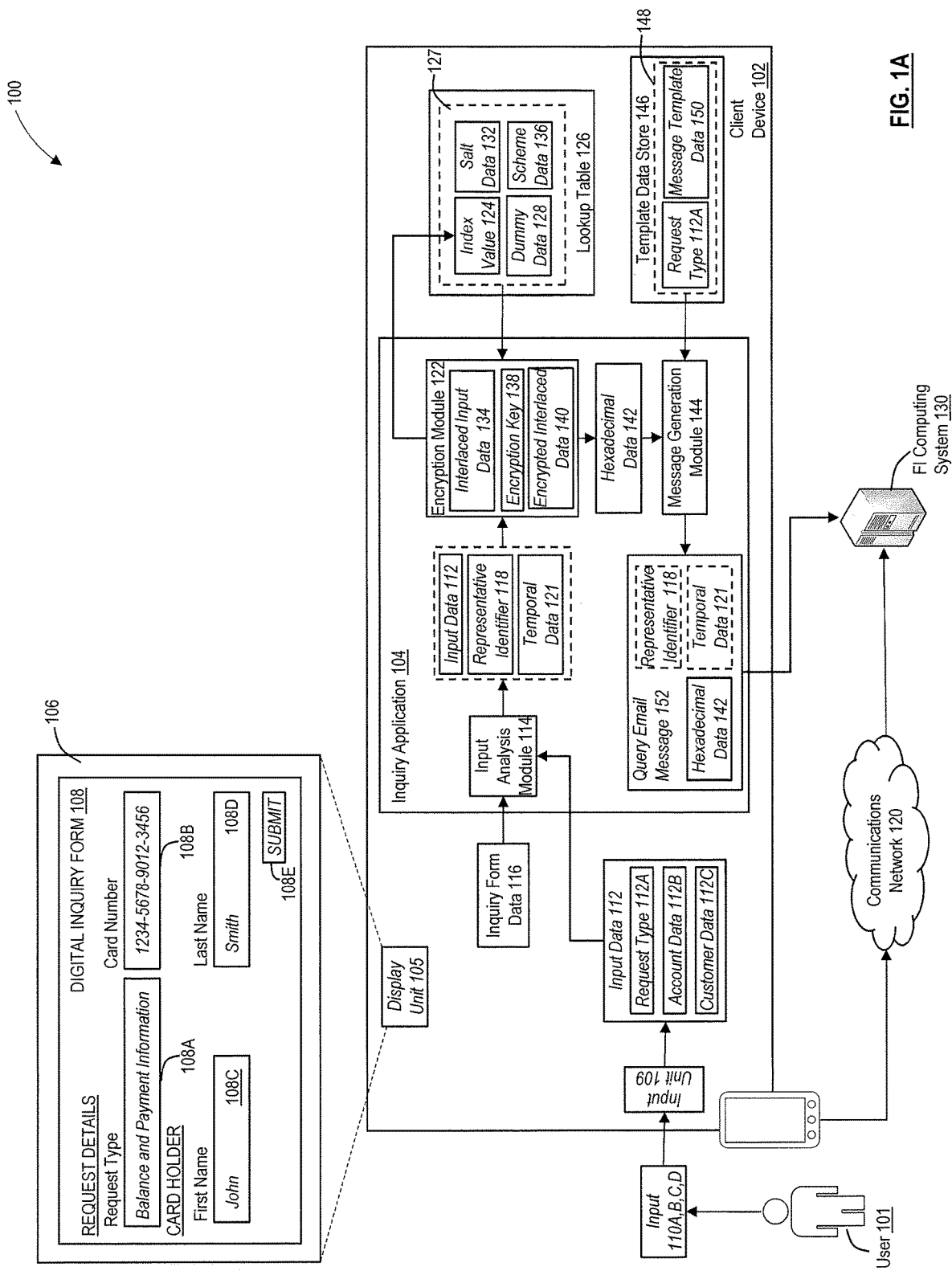
FIGS. 1A, 1B and 2A-2C are block diagrams illustrating portions of an exemplary computing environment, in accordance with some exemplary embodiments.

Today, financial institutions offer a wide variety of financial products and services through both digital channels, such as mobile applications or web-based digital portals, and through more traditional, branch-based interactions between customers and representatives of the financial institution. For example, a financial institution may offer, to one or more customers, an opportunity to apply for a particular financial product, such as a credit card account subject to corresponding terms and conditions. In some instances, while the financial institution may obtain elements of customer data that facilitates the application for the credit card account (e.g., the digital portals or personal interaction described herein), a third-party processor may process the elements of application data and complete the application process on behalf of the financial institution. Further, and upon successful completion of the application process, and the issuance of the credit card account to the customer by the financial institution, the third-party processor may also perform operations, on behalf of the financial institution, that process payments, mediate disputes and impose fees (e.g., late fees, etc.), and maintain elements of customer data characterizing the customer's payment and fee history, along with account information of the customer.

Further, in some examples, a customer of the financial institution may present, to a representative of the financial institution (e.g., by telephone or by in-branch interaction, etc.), a customer inquiry associated with a status of a pending application for a credit card account, a balance of or a current amount due in an issued credit card account, and additionally, or alternatively, to dispute a fee applied to the issued credit card account by the third-party processor. Although the financial institution may issue the credit card account to the customer, information that enables the representative of the financial institution to resolve the customer's inquiry regarding the current application status, the current payment status, or the disputed fee may be maintained not by the financial institution, but instead within one or more data repositories maintained by a computing system of a third-party processor, which may be inaccessible to the representative or to a computing system or device operable by the representative.

Instead, to access elements of the information maintained by the computing system of the third-party processor, the representative of the financial institution may initiate a telephone call with an agent of the third-party processor, or may establish contact with the agency through an additional, or alternate, insecure channel of communication, and may request and receive from the agent of the third-party processor the information that services the customer's request or inquiry. In some instances, to obtain the information capable of resolving the customer's request or inquiry, the representative of the financial institution may provide, to the agent of the third-party processor across the insecure channels of communications, elements of confidential information, such as, but not limited to, raw account numbers or governmental identifiers. The provisioning of the confidential information across insecure communication channels and to individuals outside of the financial institution may, however, increase a likelihood of not only an unauthorized distribution of elements of confidential information to individuals associated the financial institution or the third-party processor, but also of an unauthorized access and dissemination of the elements of confidential information by a malicious actor.

In some examples, a computing system or device operable by a representative of a financial institution may execute one or more application programs that, based on input provided by the representative and identifying an inquiry associated with a financial product, generate a cryptographically secure, structured query email message that includes, among other things, elements of encrypted data associated with the inquiry interlaced with corresponding elements of insensitive "dummy" data, and transmit the structured, cryptographically secure query email message to a computing system associated with a financial institution that issued the financial product. Upon receipt of the structured, cryptographically secure email message, the computing system of the financial institution may perform operations, described herein, to store the email message within a corresponding portion of a message queue, and to instantiate and/or clone one or more virtual machines, each of which may execute a programmatic, software robot configured (e.g., by processing logic provisioned to the virtual machine) to access the message queue and extract a corresponding one of the cryptographically secure, structured email messages.

Further, the executed programmatic, software robots may perform any of the exemplary processes described herein to operations to verify that a structure of the extracted email message conforms to an expected structure, and in response to the verified conformity, to decrypt the encrypted confidential data, to identify and extract the dummy data interlaced within the decrypted confidential data, and further, to interact programmatically with one or more computing systems of the third-party processor across a secure channel of communications and generate a response to the presented inquiry. Certain of these exemplary processes, which facilitate a secure resolution of a presented customer inquiry based on a cryptographically secure, structured email message that includes elements of encrypted data associated with the inquiry interlaced with corresponding elements of insensitive "dummy" data, and based on secure, programmatic communications between computing systems of the financial institution and the third-party processor, may be implemented in addition to, or as an alternate to, many existing resolution processes that rely on an exchange of confidential customer or account information across insecure channels of communication.

A. Computer-Implemented Processes for Managing Email-Based Inquiries Involving Confidential, Third-Party Data using Virtualized Programmatic Robots By way of example, a customer of a financial institution may consult with a representative of the financial institution and may present, to the representative, an inquiry related to the financial product provisioned, or available for provisioning, by the financial institution, e.g., via traditional, branch-based interaction, via telephone, or via one or more digital channels, such as a mobile application or a web-based digital portal. As described herein, the presented inquiry may be associated with, or relate to a current status of a provisioned financial product (e.g., a request for a current balance of an issued credit card account, a request for a minimum payment or a payment date associated with the issued credit card account, etc.), or may be associated with, or relate to, one or more fees imposed on a provisioned financial product (e.g., a request for amounts or dates of fees imposed on an issued credit card account during a prior temporal interval, a request to waive one or more imposed fees on a credit card account, a fee dispute, etc.). In other examples, the presented inquiry may also be associated with, or relate to, a status of a pending application for a financial product available for provisioning by the financial institution (e.g., a request for a status of a previously submitted application for an available credit card account).

As described herein, while the financial institution may perform operations that provision, or issue, the financial product or service to the customer, information that facilitates a resolution of the inquiry by the representative may not be maintained by the financial institution, but may instead be maintained within one or more data repositories that are inaccessible to a computing system or device operated by the representative. For example, the one or more data repositories may be associated with, and maintained by, a third-party processor that, on behalf of the financial institution, performs operations that process applications for the financial products available for provisioning by the financial institution, and that process payments, mediate disputes and impose fees (e.g., late fees, etc.), and maintain elements of data characterizing the customer's payment and fee history within the one or more data repositories. In some instances, to obtain portions of the data maintained within the one or more data repositories that resolve the presented inquiry, the representative of the financial institution may initiate a telephone call with an agent of the third-party processor, and may provide, to the agent, elements of confidential information, such as, but not limited to, raw account numbers or governmental identifiers. The provisioning of the confidential information across insecure communication channels and to individuals outside of the financial institution may, however, increase a likelihood of not only an unauthorized distribution of elements of confidential information to individuals associated the financial institution or the third-party processor, but also of an unauthorized access and dissemination of the elements of confidential information by a malicious actor.

In some instances, a computing system or device operated by the representative of a financial institution may, based on input provided by the representative identifying and characterizing the presented the inquiry, perform any of the exemplary processes described herein to generate a cryptographically secure, structured email message that includes, among other things, elements of encrypted data associated with the inquiry interlaced with corresponding elements of "dummy" data, and transmit the structured, cryptographically secure email to a computing system associated with a financial institution. Upon receipt of the structured, cryptographically secure email message, the computing system of the financial institution may perform operations, described herein, to store the email message within a corresponding portion of a message queue, and to instantiate and/or clone one or more virtual machines, each of which may execute a programmatic, software robot configured (e.g., by processing logic provisioned to the virtual machine) to access the message queue and extract a corresponding one of the cryptographically secure, structured email messages.

Further, the executed programmatic, software robots may perform any of the exemplary processes described herein to operations to verify that a structure of the extracted email message conforms to an expected structure, and in response to the verified conformity, to decrypt the encrypted confidential data, to identify and extract the dummy data interlaced within the decrypted confidential data, and further, to interact programmatically with one or more computing systems of the third-party processor across a secure channel of communications and generate a response to the presented inquiry. Certain of these exemplary processes, which facilitate a secure resolution of a presented customer inquiry based on a cryptographically secure, structured email message that includes elements of encrypted data associated with the inquiry interlaced with corresponding elements of "dummy" data, and based on secure, programmatic communications between computing systems of the financial institution and the third-party processor, may be implemented in addition to, or as an alternate to, many existing resolution processes that rely on an exchange of confidential customer or account information across insecure channels of communication.

FIG. 1A illustrates components of an exemplary computing environment 100, in accordance with some exemplary embodiments. For example, as illustrated in FIG. 1A, environment 100 may include one or more computing devices, such as a client device 102 and one or more computing systems, such as financial institution (FI) computing system 160. In some instances, each of client device 102 and FI computing system 130 may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories that store data and/or software instructions, and one or more processors configured to execute the software instructions. The one or more tangible, non-transitory memories may, in some aspects, store software applications, application modules, and other elements of code executable by the one or more processors, such as, but not limited to, an executable web browser (e.g., Google Chrome™, Apple Safari™, etc.) and executable application associated with FI computing system 130, such as inquiry application 104. In some instances, not illustrated in FIG. 1A, the one or more tangible, non-transitory memories of client device 102 may also include one or more structured or unstructured data repositories or databases, and client device 102 may maintain, within the one or more structured or unstructured data repositories or databases, elements of device data that uniquely identify client device 102 within computing environment 100, such as but are not limited to, an Internet Protocol (IP) address assigned to client device 102 or a media access control (MAC) layer assigned to client device 102.

Client device 102 may also include a display unit 105 configured to present interface elements to a corresponding user, and an input unit 109 configured to receive input from the, e.g., in response to the interface elements presented through display unit 105. By way of example, display unit 105 may include, but is not limited to, an LCD display unit or other appropriate type of display unit, and input unit 109 may include, but is not limited to, a keypad, keyboard, touchscreen, voice activated control technologies, or appropriate type of input unit. Further, in additional aspects (not illustrated in FIG. 1A), the functionalities of display unit 105 and input unit 109 may be combined into a single device, e.g., a pressure-sensitive touchscreen display unit that presents interface elements and receives input from the user. Client device 102 may also include a communications interface, such as a wireless transceiver device, coupled to the one or more processors and configured by the one or more processors to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

In some instances, a representative of the financial institution, such as representative 101, may operate client device 102 and may do so to cause client device 102 to perform one or more exemplary processes described herein. Examples of client device 102 may include, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within environment 100 across a wired or wireless communications channel, e.g., via the communications interface 109C using any appropriate communications protocol.

FI computing system 130 may represent a computing system that includes one or more servers and one or more tangible, non-transitory memory devices storing executable code, application engines, or application modules. Each of the one or more servers may include one or more processors, which may be configured to execute portions of the stored code, application engines, or application modules to perform operations consistent with the disclosed exemplary embodiments. In some instances, FI computing system 130 may correspond to a discrete computing system, although in other instances, FI computing system 130 may correspond to a distributed computing system having multiple, computing components distributed across an appropriate computing network, such as communications network 120 of FIG. 1A, or those established and maintained by one or more cloud-based providers, such as Microsoft Azure™, Amazon Web Services™, or another third-party, cloud-services provider. Further, FI computing system 130 may also include one or more communications units, devices, or interfaces, such as one or more wireless transceivers, coupled to the one or more processors for accommodating wired or wireless internet communication across network 120 with other computing systems and devices operating within environment 100 (not illustrated in FIG. 1A).

As described herein, FI computing system 130 may be associated with, or operated by, a financial institution that offers financial products or services to one or more customers. The financial products or services may, for example, include payment instruments issued to corresponding ones of the customers by the financial institution and available to fund initiated purchase or payment transactions, and examples of the payment instruments include, but are not limited to, a credit card account, a secured or unsecured credit product (e.g., a unsecured personal loan, etc.), or checking, savings, or other deposit account issued by and maintained at the financial institution. Further, FI computing system 130 may perform any of the exemplary processes described herein to instantiate and/or clone one or more virtual machines, each of which may execute a programmatic, software robot configured (e.g., by processing logic provisioned to the virtual machine) to obtain a cryptographically secure, structured email message associated with a customer inquiry related to a provisioned or available financial product, to verify that a structure of the extracted email message conforms to an expected structure, and in response to the verified conformity, to decrypt the encrypted confidential data, identify and extract the dummy data interlaced within the decrypted confidential data, and interact programmatically with one or more computing systems of a third-party processor associated with the financial product to resolve the presented inquiry.

Referring to FIG. 1A, a customer of the financial institution may present an inquiry to representative 101 that requests, among other things, a current balance and current payment information associated with a credit card account issued by the financial institution. Based on the received inquiry, representative 101 may provision input (not illustrated in FIG. 1A) to client device 102 that causes the one or more processors of client device 102 to execute an application program associated with the presented inquiry, such as, but not limited to, a web browser or inquiry application 104. For example, and upon execution by the one or more processors of client device 102, executed inquiry application 104 may perform operations that present, via display unit 105, a digital interface, such as digital interface 106 of FIG. 1A, that includes one or more interface elements that establish a digital inquiry form 108 and prompt representative 101 to provide further input to client device 102 (e.g., via input unit 109) that specifies information characterizing the customer, the credit card account, and the inquiry associated with the current balance and current payment information.

For example, digital inquiry form 108 may include an interactive interface element 108A that prompts representative 101 to provide input to client device 102 (e.g., via input unit 109) that specifies an inquiry type associated with the presented inquiry related to the current balance and current payment information associated with the credit card account. In some instances, interactive interface element 108A may correspond to an interactive text box, or an interactive, pull-down menu that enables representative 101 to select one or more plurality of predetermined inquiry types, such as, but not limited to: (i) a "balance and payment information" inquiry type associated with inquiries related to general account information, such as a current account balance, a last payment amount and date, and/or minimum payment amount and due data; (ii) a "recently declined transactions" inquiry type associated with inquiries related to recently declined transactions (e.g., a response to which may include a restrictive status code of declined transaction, recent declined transactions over a time period, such as fourteen days, etc.); (iii) a "fee history" inquiry type associated with inquiries related to one or more fees imposed onto the credit card account (e.g., a response which may include amounts or dates of fees imposed during a prior temporal interval, such as three months); (iv) a "fee waiver" associated with inquiries related to a request to waive a recently imposed fee (and which may be responsive to a prior request for a fee history); and/or (v) an "application status" associated with inquiries related to pending applications for a credit card or other financial product (e.g., a response to which may include application information and an application status). In some instances, and based on the interface elements presented within digital inquiry form 108, representative 101 may provide input 110A to input unit 109 that, among other things, selects the "balance and payment information" inquiry type from the pull-down menu of interactive interface element 108A.

Digital inquiry form 108 may also include additional, interactive interface elements that identify and characterize the financial product and the customer associated with the presented inquiry. For example, digital inquiry form 108 may include an interactive interface element 108B, which prompts representative 101 to provide input to client device 102 (e.g., via input unit 109) that specifies an identifier of the credit card account associated with the presented inquiry (e.g., an account number, etc.), and interactive interface elements 108C and 108D, which prompt representative 101 to provide input to client device 102 (e.g., via input unit 109) that specifies a first and last name of the customer associated with the presented inquiry. In some instances, and based on the interface elements presented within digital inquiry form 108, representative 101 may provide input 110B to input unit 109 that specifies the account number of the credit card account associated with the presented inquiry (e.g., "1234-5678-9012-3456") within a text box of interactive interface element 108B. Representative 101 may also provide input 110C to input unit 109 that specifies the first name of the customer associated with the presented inquiry (e.g., "John") within a text box of interactive interface element 108C and the last name of the customer (e.g., "Stone") within a text box of interactive interface element 108D.

Further, representative 101 may provide additional input 110D to input unit 109 that selected "SUBMIT" icon 108E that submits the provisioned information characterizing the customer, the credit card account, and the inquiry associated with the current balance and current payment information to inquiry application 104. In some instances, and upon execution by the one or more processors of client device 102, executed inquiry application 104 may perform any of the exemplary processes described herein to process the information characterizing the customer, the credit card account, and the inquiry associated with the current balance and current payment information, to generate a cryptographically secure, structured email message that includes, among other things, encrypted portions of the information interlaced with corresponding elements of "dummy" data, and to cause client device 102 to transmit the structured, cryptographically secure email across network 120 to FI computing system 130.

As illustrated in FIG. 1A, input unit 109 may receive each of representative inputs 110A, 110B, 110C, and 110D, and may generate elements of input data 112 and route the elements of input data 112 to executed inquiry application 104. The elements of input data 112 may include an element 112A that identifies the inquiry type specified by representative 101 (e.g., the "balance and payment information" inquiry type), and element 112B that includes the account number of the credit card account associated with the presented inquiry (e.g., "1234-5678-9012-3456"), and element 112C that includes the name of the customer associated with the presented inquiry (e.g., "John Smith"). In some instances, an input analysis module 114 of executed inquiry application 104 may receive the elements of input data 112, and based on elements 112A, 112B, and 112C of input data 112, executed input analysis module 114 may perform operations that validate a format, a structure, and/or a composition of the provisioned input, e.g., the "balance and payment information" inquiry type, the account number "1234-5678-9012-3456," and the customer name "John Smith."

For example, and based on element 112A of input data 112, executed input analysis module 114 may obtain, from the one or more tangible, non-transitory memories, elements of inquiry form data 116 associated with the "balance and payment information" inquiry type specified by representative 101. In some instances, the elements of inquiry form data 116 may include information characterizing an expected structure of the provisioned account number or the provisioned customer name (e.g., that the account number includes sixteen digits, that the first and last names of the customer include at least a threshold number of characters, such as two, etc.), and additionally, or alternatively, information characterizing an expected structure of the provisioned account number or the provisioned customer name (e.g., that none of the digits of the account number are out-of-range or include alphabetic characters, etc.). Further, and based on the elements of inquiry form data 116, and based on elements 112B and 112C, executed input analysis module 114 may perform operations that determine whether a structure of composition of the provisioned account number and the provisioned customer name are consistent with corresponding ones of the expected composition or the expected structure.

If, for example, executed input analysis module 114 were to determine that the structure or composition of the provisioned account number and the provisioned customer name are inconsistent with corresponding ones of the expected composition or the expected structure, executed input analysis module 114 may decline to validate the elements of input data 112, and may perform operations (not illustrated in FIG. 1A) that generate an error message identifying those portions of the provisioned account number and the provisioned customer name that are inconsistent with the expected composition or structure. Further, executed inquiry application 104 may also perform operations (not illustrated in FIG. 1A) that cause client device 102 to present a graphical representation of the error message within digital interface 106, .g., within a pop-up window that obscures at least a portion of digital inquiry form 108.

Alternatively, if executed input analysis module 114 were to determine that the structure or composition of the provisioned account number and the provisioned customer name are each consistent with the expected composition and structure, executed input analysis module 114 may decline to validate the elements of input data 112, and may perform operations that generate, or obtain, a representative identifier 118 of representative 101 and elements of temporal data 121 that identify a time or date at which executed inquiry application 104 received the elements of input data 112. For example, representative identifier 118 may include, among other things, an alphanumeric identifier assigned to representative 101 by the financial institution, a digital token or cryptogram having a predetermined structure or composition, or another elements or alphanumeric or cryptographic data that identifies representative 101 at FI computing system 130. Executed input analysis module 114 may also provide the elements of input data 112 (including elements 112A, 112B, and 112C), representative identifier 118, and temporal data 121 as input to an encryption module 122 of executed inquiry application 104.

In some instances, executed encryption module 122 may receive the elements of input data 112 (including elements 112A, 112B, and 112C), representative identifier 118, and temporal data 121, and may perform operations that compute a numerical index value 124 based on, one or more portions of representative identifier 118 and temporal data 121 (e.g., based on an application of an indexing process associated with a corresponding encryption process, such as an AEC-256-CBC or an AEC-256-GBM process, to the portions of representative identifier 118 and temporal data 121). Executed encryption module 122 may also access one or more elements of a lookup table 126, which associate respective elements of dummy data and respective salts (e.g., consistent with the encryption process or algorithm, etc.) with corresponding numerical index values, and executed encryption module 122 may determine that a corresponding one of the elements of lookup table 126, e.g., element 127, includes numerical index value 124.

Executed encryption module 122 may obtain elements of dummy data 128 and salt data 132 from the elements of lookup table 126, and executed encryption module 122 may perform operations that interlace discrete portions of element 112B of input data 112 (e.g., that specifies the account number of the credit card account associated with the presented inquiry, e.g., "1234-5678-9012-3456") and element 112C of input data 112 (e.g., that specifies the name of the customer associated with the presented inquiry, e.g., "John Stone") into, or within, the elements of dummy data 128, and generate corresponding elements of interlaced input data 134. The elements of dummy data 128 may include unencrypted, and insensitive, elements of textual or alphanumeric content unrelated to the customer, the credit card account, or the presented inquiry (e.g., alphanumeric character strings of predetermined or various lengths) and salt data 132 may include a random or pseudo-random number or character string of predetermined length.

In some instances, executed encryption module 122 the perform the operations that interlace the discrete portions of elements 112B and 112C into, or within, the elements of dummy data 128 in accordance with a corresponding interlacing scheme or mechanism, e.g., as specified by scheme data 136 maintained within element 127 of lookup table 126 or associated with the "balance and payment information" inquiry type specified by element 112A of input data 112. By way of example, scheme data 136 may establish a sequential order of the elements of dummy data 128 within interlaced input data 134, and may specify a disposition of each of the portions of elements 112B and 112C of input data 112 (e.g., the portions of account number "1234-5678-9012-3456" and customer name "John Stone") among the sequentially ordered elements of dummy data 128, e.g., disposed ahead of, trailing behind, or disposed between corresponding ones of the sequentially ordered elements of dummy data 128. In some instances, executed encryption module 122 may perform operations that decompose elements 112B and 112C of input data 112 into corresponding portions of predetermined length, composition, or structure (e.g., as specified within scheme data 136), and interlace the decomposed portions of elements 112B and 112C at corresponding positions among the sequentially ordered elements of dummy data 128 in accordance with scheme data 136.

Further, executed encryption module 122 may generate an encryption key 138 based on an application of a key generation process associated with, and consistent with, the corresponding encryption process (e.g., the AEC-256-CBC or an AEC-256-GBM encryption process, etc.) to each, or a selected portion of, representative identifier 118, temporal data 121, and numerical index value 124, and executed encryption module 122 may encrypt all, or a selected portion of, interlaced input data 134 using encryption key 138 and salt data 132, e.g., to generate encrypted interlaced data 140. Executed encryption module 122 may perform operations that generate a hexadecimal representation of the elements of encrypted interlaced data 140 (e.g., by converting the alphanumeric characters within encrypted interlaced data 140 into hexadecimal format), and that package the hexadecimal representation into portions of hexadecimal data 142, which executed encryption module 122 may provide as an input to a message generation module 144 of executed inquiry application 104.

In some instances, executed message generation module 144 may perform operations that determine the inquiry type associated with the presented inquiry based on element 112A of input data 112 (e.g., the "balance and payment information" inquiry type described herein), and that access a template data store 146 maintained within the one or more tangible, non-transitory memories of client device 102. Executed message generation module 144 may parse the elements of template data store 146, identify a corresponding ones of the elements, e.g., elements 148, associated with the "balance and payment information" inquiry type specified by element 112A of input data 112, and obtain, from element 148, elements of message template data 150 characterizing a composition or layout of a message template, such as a template for an HTML-based query email message 152, appropriate to the "balance and payment information" inquiry type specified by element 112A. Message template data 150 may, for example, specify a particular subject or tagline for the query email message 152, which may be recognizable by FI computing system 130, and further, may include elements of additional content, arranged in a particular layout or format, that is recognizable by FI computing system 130.

Executed message generation module 144 may process message template data 150, and may perform operations that populate message template data 150 with corresponding portions of hexadecimal data 142 (e.g., the hexadecimal representation of encrypted interlaced data 140), representative identifier 118, in some instances, temporal data 121. For example, executed message generation module 144 may parse message template data 150 to identify elements of placeholder data associated with the portions of hexadecimal data 142 (e.g., the hexadecimal representation of encrypted interlaced data 140), representative identifier 118, and/or temporal data 121, and perform operations that populate message template data 150 by replacing the placeholder data elements of corresponding portions of the hexadecimal data 142, representative identifier 118, and/or temporal data 121.

Executed inquiry application 104 also performs operations that cause the client device 102 transmit the query email message 152 across network 120 to FI computing system 130. In some instances, not illustrated in FIG. 1A, executed inquiry application 104 may also perform operations that cause client device 102 to present a graphical representation of a confirmation of a successful generation and transmission of query email message 152 to FI computing system 130 (or alternatively, a failed generation of query email message 152) within digital interface 106, e.g., within a an additional pop-up window that obscures at least a portion of digital inquiry form 108.

Figure 1B:
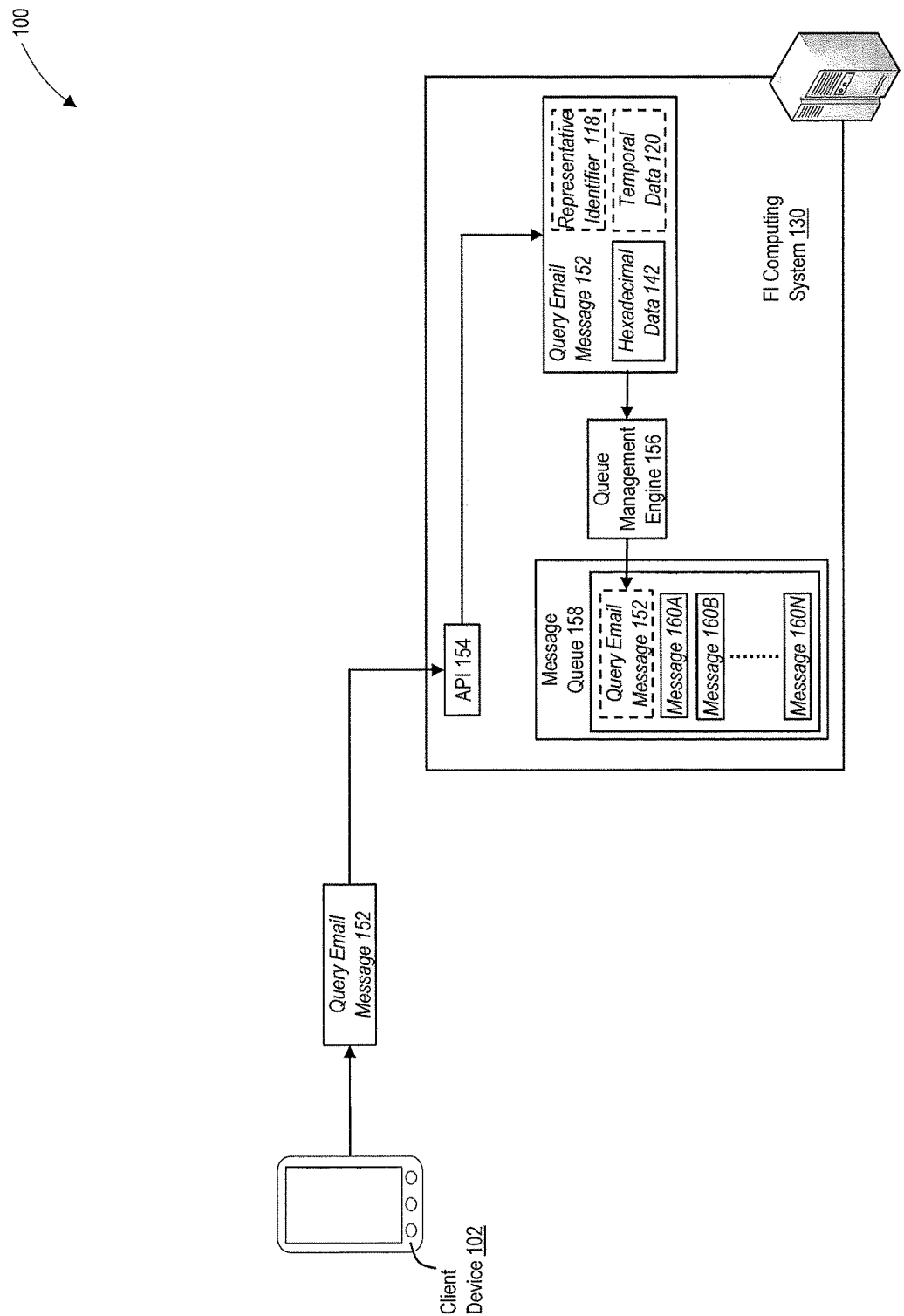

Referring to FIG. 1B, programmatic interface established and maintained by FI computing system 130, such as an application programming interface (API) 154 associated with a queue management engine 156, may receive query email message 152. API 154 may perform operations that trigger an execution of queue management engine 156 executable by the one or more processors of FI computing system 130 (e.g., based on programmatically generated instructions, etc.), and that route query email message 152 to executed queue management engine 156. In some instances, executed queue management engine 156 may perform operations that store query email message 152, which includes hexadecimal data 142 (e.g., the hexadecimal representation of encrypted interlaced data 140) and in some instances, representative identifier 118 or temporal data 121, in a corresponding portion of the one or more tangible, non-transitory memories of FI computing system 130, e.g., within message queue 158.

By way of example, message queue 158 may include one or more additional, or alternate, query email messages, such as query email messages 160A, 160B, . . . 160N associated with corresponding inquiries presented to representative 101 and other representatives of the financial institution, and received from client device 102 and other computing devices or systems of the representatives during one or more prior temporal intervals. In some instances, query email messages 160A, 160B, . . . 160N maintained within message queue 158 may be ordered and prioritized in accordance with message characteristics that include, but are not limited to, a time or date of receipt by the FI computing system 130, a time or date associated with the corresponding inquiry (e.g., portions of the temporal data 121 included in the query email message 152, etc.), or other characteristics of the customer inquiry, such as, but not limited to, a corresponding inquiry type (e.g., the "balance and payment information" inquiry type associated with query email message 152, etc.).

Figure 2A:
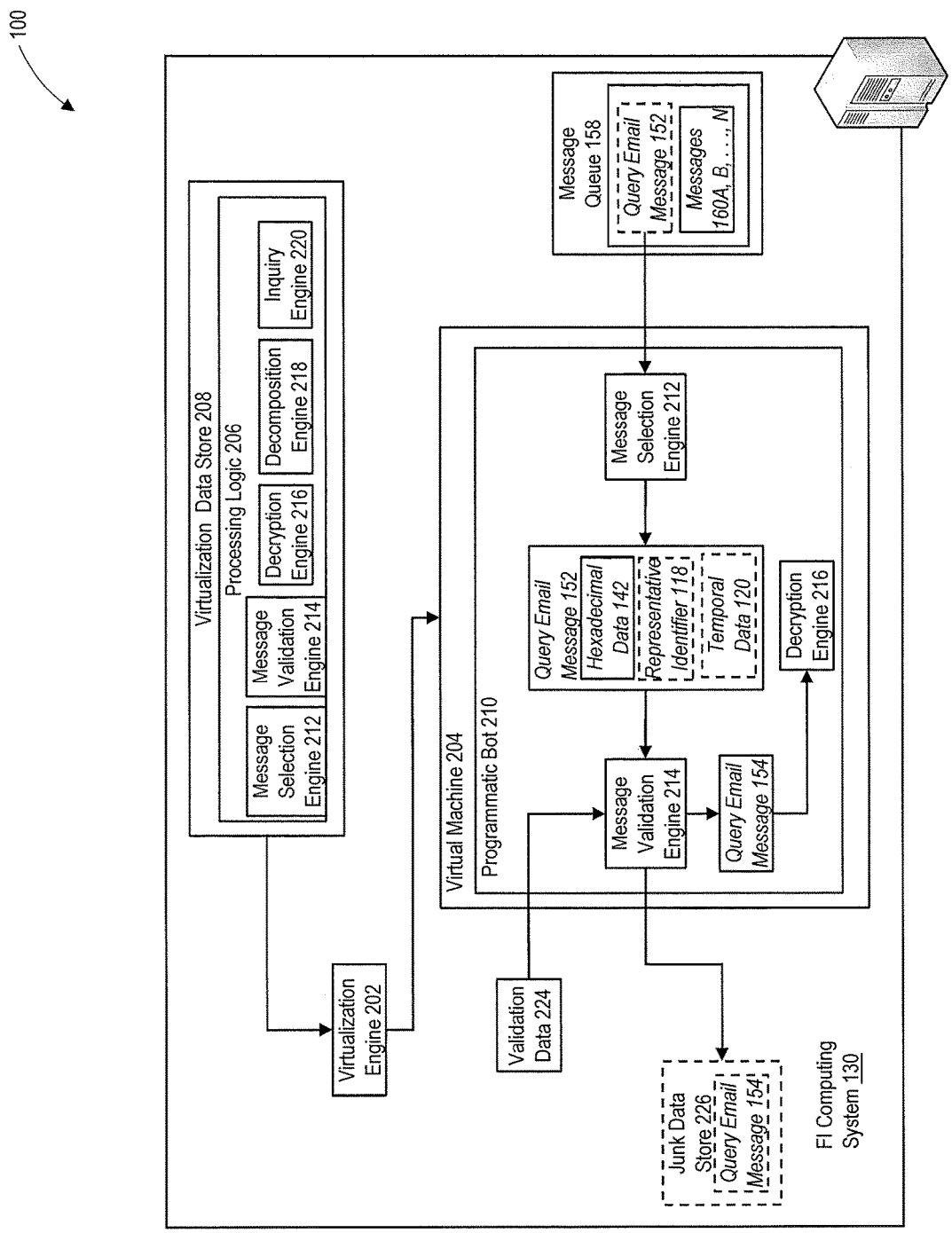

Referring to FIG. 2A, the one or more processors of FI computing system 130 may execute a virtualization engine 202, which may perform any of the exemplary processes described herein to instantiate or clone one or more virtual machines, each of which may establish and execute one or more programmatic, software robots configured (e.g., by elements of processing logic 206 provisioned to each of the instantiated or cloned virtual machines) to access the query email message 152 and extract a corresponding one of the queued query email messages. Further, each of the executed programmatic robots may perform any of the exemplary processes described herein to verify that a structure or format of the corresponding query email message conforms to an expected structure or format, and in response to the verified conformity, to access the hexadecimal representation of the encrypted interlaced input data within the corresponding query email message, to convert the hexadecimal representation to text and to decrypt the encrypted interlaced input data using a corresponding, message-specific decryption key, to obtain information characterizing a corresponding customer inquiry from the decrypted interlaced input data, to perform operations that interact programmatically with one or more computing systems of the third-party processor across a secure channel of communications to obtain information that responds to, and resolves, the corresponding customer inquiry.

As illustrated in FIG. 2A, executed virtualization engine 202 may perform operations that instantiate a virtual machine 204, or that clone virtual machine 204 based on a previously instantiated virtual machine. Executed virtualization engine 202 may also perform operations that access a virtualization data store 208 maintained within the one or more tangible, non-transitory memories of FI computing system 130, and obtain elements of processing logic 206 that include one or more application programs, program modules or engines, or other elements of code executed by virtual machine 204, or by one or more programmatic software robot established and managed by virtual machine 204, such as, but not limited to, programmatic bot 210. By way of example, the elements of processing logic 206 may include, among other things, a message selection engine 212, a message validation engine 214, a decryption engine 216, a decomposition engine 218, and an inquiry engine 220 that, when executed by the one or more processors of FI computing system 130, cause each of the programmatic software robots established and managed by virtual machine 204, such as programmatic bot 210, to perform any of the exemplary processes described herein.

By way of example, and upon execution by the one or more processors of FI computing system 130, message selection engine 212 may perform operations that cause programmatic bot 210 to access message queue 158, and identify and extract a corresponding one of the ordered and prioritized query email messages, such as query email message 152. For example, the identified and extracted query email message may correspond to an initial email message within the ordered and prioritized query email messages of message queue 158, e.g., the query email message associated with a "highest" priority or a longest pendency within message queue 158. Further, executed message selection engine 212 may cause programmatic bot 210 to access the message queue 158 at corresponding predetermined temporal intervals, e.g., every thirty seconds, or in response to a detection of a triggering event, e.g., a detected storage of a new email message within the message queue 158 or a determination that the message queue 158 maintains greater than a threshold number of email messages. Executed message selection engine 212 may route query email message 152, which includes hexadecimal data 142 (e.g., the hexadecimal representation of encrypted interlaced data 140), representative identifier 118, in some instances, temporal data 121, to message validation engine 214 that, upon execution by the one or more processors of FI computing system 130, causes programmatic bot 210 to validate that a structure or composition of query email message 152 is consistent with an expected structure or composition.

Executed message validation engine 214 may receive query email message 152, and may perform operations that determine whether query email message 152 includes a valid subject (or tagline) and is associated with a valid sender, e.g., client device 102. In some instances, to validate the subject (or tagline) and sender of query email message 152, the executed message validation engine 214 may perform operations that obtain elements of validation data 224 that include a list of acceptable or expected domain names associated with a device that generated and transmitted query email message 152 and that specify, for the inquiry types described herein, one or more elements of predetermined or expected content associated with the subject or tagline of query email message 152. By way of example, executed message validation engine 214 may perform operations that parse query email message 152, and obtain a domain name of that device that transmitted query email message 152 (e.g., the domain name associated with client device 102) and textual content associated with the subject or tagline of query email message 152.

If executed message validation engine 214 were to determine that the obtained domain name fails to correspond to an acceptable or expected domain name, or that the obtained textual content is inconsistent with the expected textual content associated with the subjects or taglines of the query email messages, executed message validation engine 214 may deem invalid query email message 152. Executed message validation engine 214 may, in some instances, store now-invalidated query email message 152 within a junk data store 226 maintained within the one or more tangible, non-transitory memories of FI computing system 130, and may transmit an error message to executed message selection engine 212, which may cause programmatic bot 210 to perform operations (not illustrated in FIG. 2A) that delete query email message 152 from message queue 158 and to obtain an additional queued email message from message queue 158.

Alternatively, and based on portions of validation data 224, executed message validation engine 214 may determine that the obtained domain name of client device 102 corresponding to an acceptable or expected domain name, and further, that the obtained textual content corresponding to textual content expected within a subject or tagline of a query email message associated with the "balance and payment information" inquiry type. Based on these determinations, executed message validation engine 214 may deem valid the subject (or tagline) and sender of query email message 152, and may perform operations that obtain an additional elements of validation data 224 characterizing an expected layout or structure of the query email message associated with the "balance and payment information" inquiry type. Based on the additional elements of validation data 224, executed message validation engine 214 may determine whether the layout or structure of email query message 152 is consistent with the expected layout or structure of the query email message associated with the "balance and payment information" inquiry type.

If, for example, executed message validation engine 214 were to determine that the layout or structure of email query message 152 is consistent with the expected layout or structure, executed message validation engine 214 may route query email message 152 to decryption engine 216 that, upon execution by the one or more processors of FI computing system 130, causes programmatic bot 210 to perform any of the exemplary processes described herein to access the hexadecimal representation of the encrypted interlaced data 140 within hexadecimal data 142, to convert the hexadecimal representation to text, and to decrypt encrypted interlaced input data 1440 using a corresponding decryption key. In other examples, if executed message validation engine 214 were to determine that the layout or structure of email query message 152 is inconsistent with the expected layout or structure, executed message validation engine 214 may perform any of the exemplary operations described herein (not illustrated in FIG. 2A) that store query email message 152 within a junk data store 226 and transmit the error message to executed message selection engine 212.

Figure 2B:
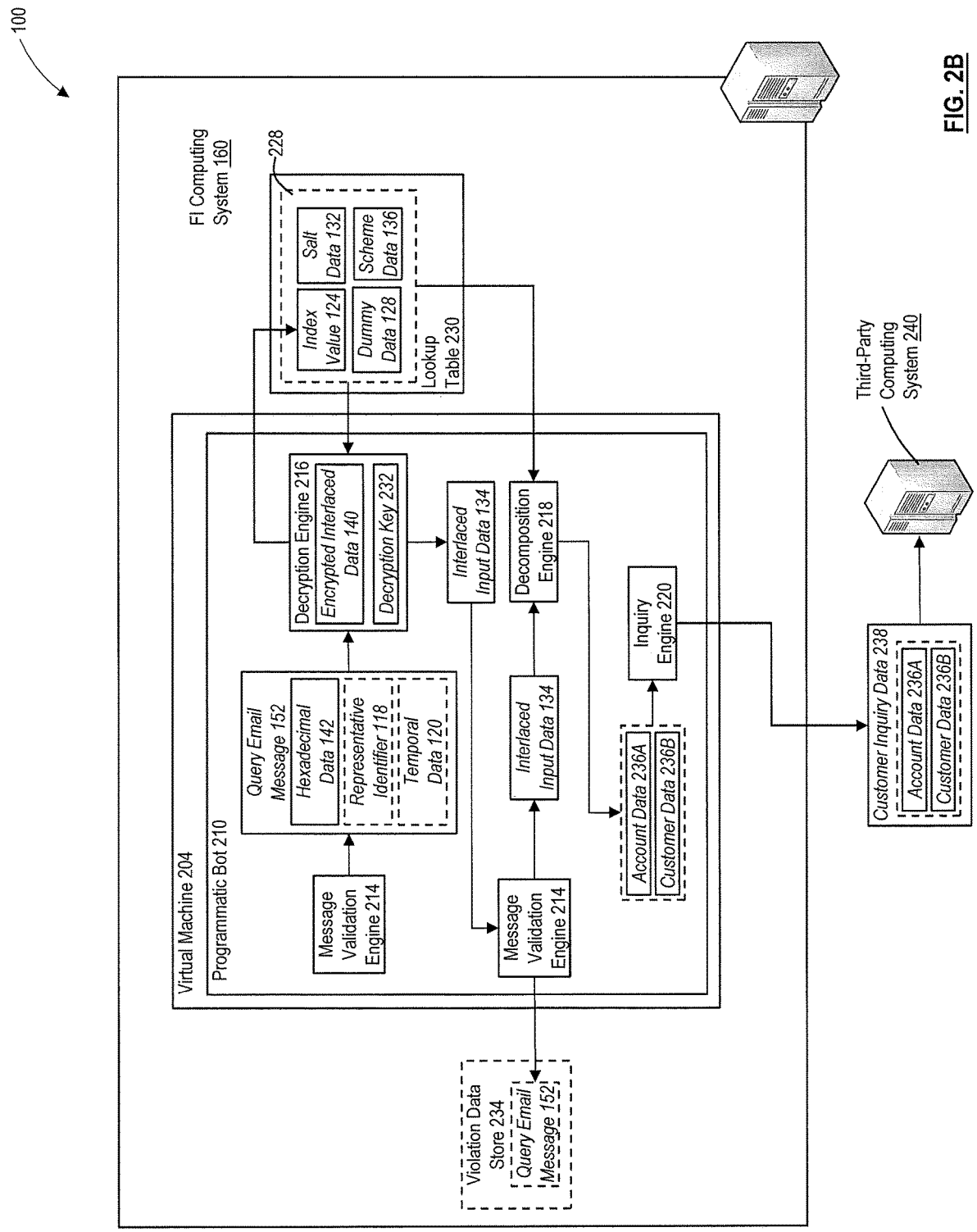

Referring to FIG. 2B, executed decryption engine 216 may receive query email message 152, which includes hexadecimal data 142 (e.g., the hexadecimal representation of encrypted interlaced data 140), representative identifier 118, in some instances, temporal data 121. Executed decryption engine 216 may access hexadecimal data 142 within query email message 152 and obtain the hexadecimal representation of encrypted interlaced data 140, and may perform operations that convert the hexadecimal representation to text and obtain encrypted interlaced data 140 (e.g., to "decode" the hexadecimal representation by converting each hexadecimal byte within hexadecimal data 142 into a decimal value, and obtaining a corresponding character associated with the decimal value from tabulated data, such as an ASCII™ table). Executed decryption engine 216 may also perform any of the exemplary processes described herein to re-compute numerical index value 124 based on, one or more portions of representative identifier 118 and temporal data 121 (e.g., based on an application of an indexing process associated with a corresponding encryption process, such as an AEC-256-CBC or an AEC-256-GBM process, to the portions of representative identifier 118 and temporal data 121) and to access an element 228 of a lookup table 230 that includes numerical index value 124 (e.g., as maintained within the one or more tangible, non-transitory memories of FI computing system 130) and associates numerical index value 124 with corresponding elements of dummy data 128, salt data 132, and scheme data 136.

Executed decryption engine 216 may also perform operations that generate a decryption key 232 based on an application of a key generation process associated with, and consistent with, the corresponding encryption process (e.g., the AEC-256-CBC or an AEC-256-GBM encryption process, etc.) to each, or a selected portion of, representative identifier 118, temporal data 121, and numerical index value 124. In some instances, executed decryption engine 216 may decrypt all, or a selected portion, of encrypted interlaced data 140 using decryption key 232 and salt data 132, and executed decryption engine 216 may route the decrypted interlaced data, e.g., interlaced input data 134, to message validation engine 214 that, upon execution by the one or more processors of FI computing system 130, causes programmatic bot 210 to validate that a structure or composition of the now-decrypted elements of interlaced input data 134.

As described herein, interlaced input data 134 may interlace portions of the account number (e.g., "1234-5678-9012-3456") and the customer name ("John Stone") associated with the presented customer inquiry at corresponding positions among the sequentially ordered elements of dummy data 128 in accordance with the interlacing scheme or mechanism specified by scheme data 136. In some instances, executed message validation engine 214 may access scheme data 136 (e.g., as maintained within element 228 of lookup table 230), and determine that the structure of interlaced input data 134, and the disposition of the portions of the account number and the customer name within the elements of dummy data 128 is consistent with the interlacing scheme or mechanism specified by scheme data 136. Further, executed message validation engine 214 may also perform any of the exemplary processes described herein to determine whether a composition or structure of the interlaced portions of the account number and the customer name are consistent with corresponding ones of the expected composition or the expected structure.

If, for example, executed message validation engine 214 were to determine that the structure of interlaced input data 134 is inconsistent with the interlacing scheme or mechanism specified by scheme data 136, or that the composition or structure of the interlaced portions of the account number and the customer name are inconsistent with the expected composition or structure, executed message validation engine 214 may deem invalid interlaced input data 134. Executed message validation engine 214 may, in some instances, perform operations that cause programmatic bot 210 to store query email message 152 within a violation data store 234 maintained within the one or more tangible, non-transitory memories of FI computing system 130, and may transmit an error message to executed message selection engine 212, which may cause programmatic bot 210 to perform operations (not illustrated in FIG. 2A) that add information characterizing the query email message 152 to a security violation report for manual review and interventions, that delete query email message 152 from message queue 158, and that obtain an additional queued email message from message queue 158.

Alternatively, if executed message validation engine 214 were to determine that the structure of interlaced input data 134 is consistent with the interlacing scheme or mechanism specified by scheme data 136, and that the composition or structure of the interlaced portions of the account number and the customer name are inconsistent with the expected composition or structure, executed message validation engine 214 may deem valid interlaced input data 134. In some instances, executed message validation engine 214 may provide interlaced input data 134 as an input to decomposition engine 218 that, upon execution by the one or more processors of FI computing system 130, causes programmatic bot 210 to obtain the interlaced portions of the account number (e.g., "1234-5678-9012-3456") and the customer name ("John Stone") associated with the customer inquiry from interlaced input data 134 based on the interlacing scheme or mechanism specified within scheme data 136. For example, executed decomposition engine 218 may access element 228 of lookup table 230 and obtain the elements of dummy data 128 and scheme data 136. Based on the elements of scheme data 136, executed decomposition engine 218 perform operations that extract each of the portions of the interlaced portions of the account number (e.g., "1234-5678-9012-3456") and the customer name ("John Stone") from among the elements of dummy data 128 of interlaced input data 134, and that package the extracted portions of the account number and the customer name into respective ones of the account data 236A and customer data 236B.

In some instances, executed decomposition engine 218 may provision account data 236A and customer data 236B as inputs to inquiry engine 220, which upon execution by the one or more processors of FI computing system 130, may perform operations that cause programmatic bot 210 to interact programmatically with a computing system operated by a third-party processor, such as third-party computing system 240, and obtain information that resolves the presented customer inquiry associated with the current balance and current payment information for the credit card account issued by the financial institution. For example, executed inquiry engine 220 may perform operations that establish, across network 120, a secure, programmatic channel of communications with one or more application programs executed by third-party computing system 240 (e.g., via interaction with one or more programmatic interfaces, etc.). Executed inquiry engine 220 may perform operations that generate one or more elements of customer inquiry 238 that include account data 236A and customer data 236B (e.g., the account number and customer name associated with the presented customer inquiry involving the current balance and current payment information for the credit card account issued by the financial institution), and that cause FI computing system 130 to transmit the elements of customer inquiry 238 to third-party computing system 240 via the secure, programmatic channel of communications.

In some instances, third-party computing system 240 may represent a computing system that includes one or more servers and one or more tangible, non-transitory memory devices storing executable code, application engines, or application modules. Each of the one or more servers may include one or more processors, which may be configured to execute portions of the stored code, application engines, or application modules to perform operations consistent with the disclosed exemplary embodiments. Third-party computing system 240 may correspond to a discrete computing system, although in other instances, third-party computing system 240 may correspond to a distributed computing system having multiple, computing components distributed across an appropriate computing network, such as communications network 120, or those established and maintained by one or more cloud-based providers, such as Microsoft Azure™, Amazon Web Services™, or another third-party, cloud-services provider. Further, third-party computing system 240 may also include one or more communications units, devices, or interfaces, such as one or more wireless transceivers, coupled to the one or more processors for accommodating wired or wireless internet communication across network 120 with other computing systems and devices operating within environment 100 (not illustrated in FIG. 2B or 2C).

Figure 2C:
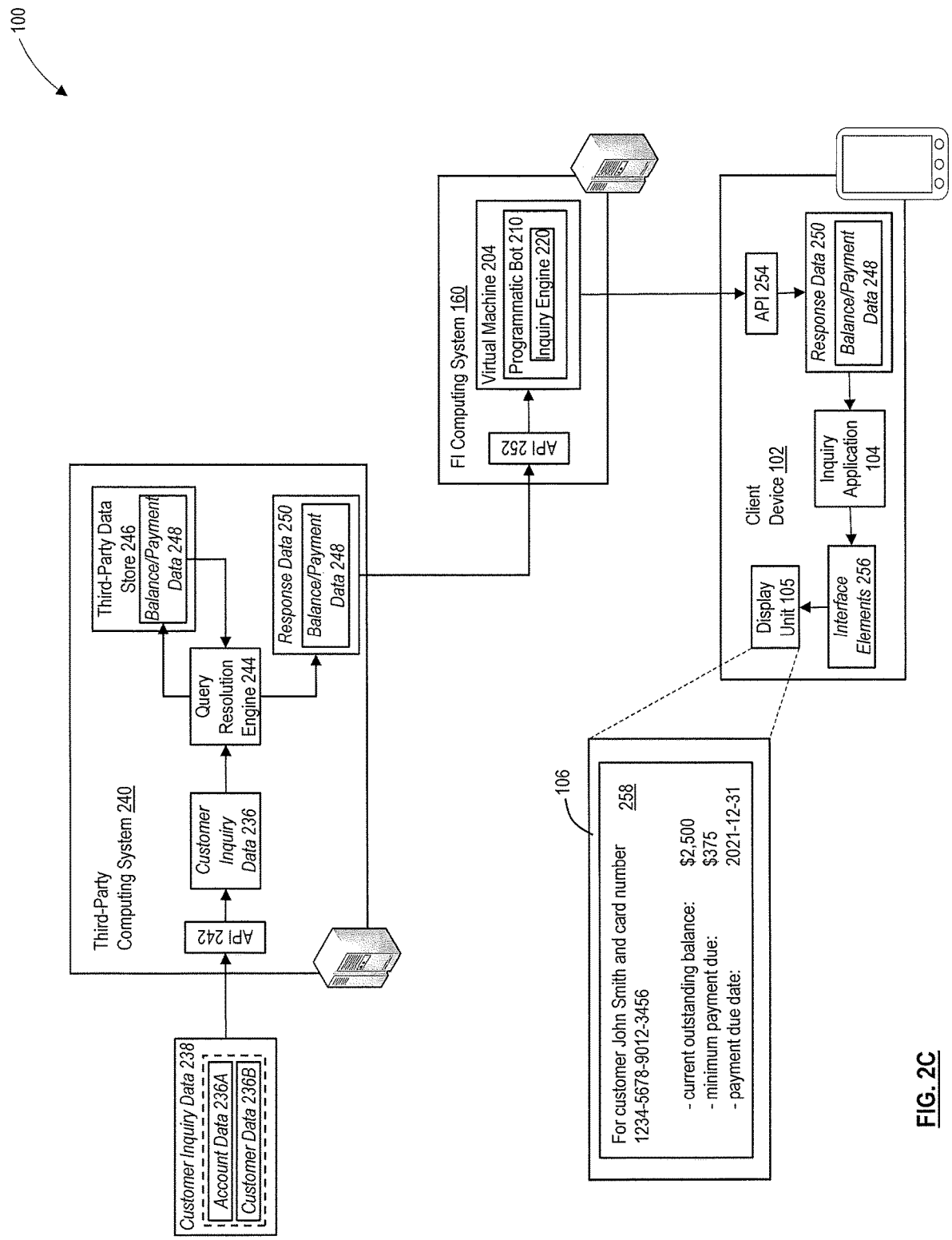

Referring to FIG. 2C, a programmatic interface established and maintained by third-party computing system 240, such as an API 242 associated with associated with a query resolution engine 244 executable by the one or more processors of third-party computing system 240, may receive the elements of customer inquiry 238, which include account data 236A and customer data 236B. API 242 may perform operations that trigger an execution of query resolution engine 244 executable by the one or more processors of third-party computing system 240 (e.g., based on programmatically generated instructions, etc.), and that route query customer inquiry 238 to executed query resolution engine 244. In some instances, third-party computing system 240 may be associated with, or operated by, a third-party processor that, on behalf of the financial institution associated with FI computing system 130, performs operations that process applications for the financial products available for provisioning by the financial institution, and that process payments, mediate disputes and impose fees (e.g., late fees, etc.), and maintain elements of data characterizing the customer's payment and fee history within the one or more data repositories, e.g., within third-party data store 246.

Executed query resolution engine 244 may, for example, perform operations that obtain account data 236A and customer data 236B from customer inquiry 238, and that parse account data 236A and customer data 236B and obtain the account number (e.g., "1234-5678-9012-3456") and the customer name ("John Stone") associated with the customer inquiry involving the current balance and payment information for the credit-card account. In some instances, executed query resolution engine 244 may access elements of balance and payment data 248 indicating a current balance of $2,500.00 for the credit card account held by John Smith and associated with account number "1234-5678-9012-3456," and that minimum payment of $375.00 is due on or before Dec. 31, 2021. Executed query resolution engine 244 may package balance and payment data 248 into corresponding portions of response data 250, which third-party computing system 240 may transmit across network 120 to FI computing system 130.

A programmatic interface established and maintained by FI computing system 130, such as API 252 associated with programmatic bot 210, may receive response data 250, including the elements of balance and payment data 248, and may route response data 250 to executed inquiry engine 220. In some instances, executed inquiry engine 220 may also perform operations that obtain a network address of client device 102 (e.g., an IP address) based on representative identifier 118 within query email message 152, and that cause FI computing system 130 to transmit response data 250 across network 120 to client device 102, e.g., using the network address. Further, a programmatic interface established and maintained by client device 102, such as an API 254 associated with executed inquiry application 104, may receive response data 250, including the elements of balance and payment data 248, and may route response data 250 to executed inquiry application 104. In some instances, based on the elements of balance and payment data 248 included within response data 250, and on elements 112A, 112B, and 112C of input data 112, executed inquiry application 104 may perform operations that generate one or more interface elements 256 and route interface elements 256 to display unit 105. When rendered for presentation within digital interface 106, interface elements 256 may provide a graphical representation 258 of response data 250 that identifies the account number of the credit card account (e.g., "1234-5678-9012-3456") and the customer name (e.g., "John Stone"), indicates the current outstanding balance of $2,500.00, and indicates that a minimum payment of $375.00 is due for the credit card account on or before Dec. 31, 2021. In some instances, not illustrated in FIG. 2B, representative 101 may provide the response to the customer inquiry, e.g., the current balance and minimum payment amount of the credit card account, to the customer via traditional, branch-based interaction, via telephone, or via one or more digital channels, such as a mobile application or a web-based digital portal.

Figure 3:
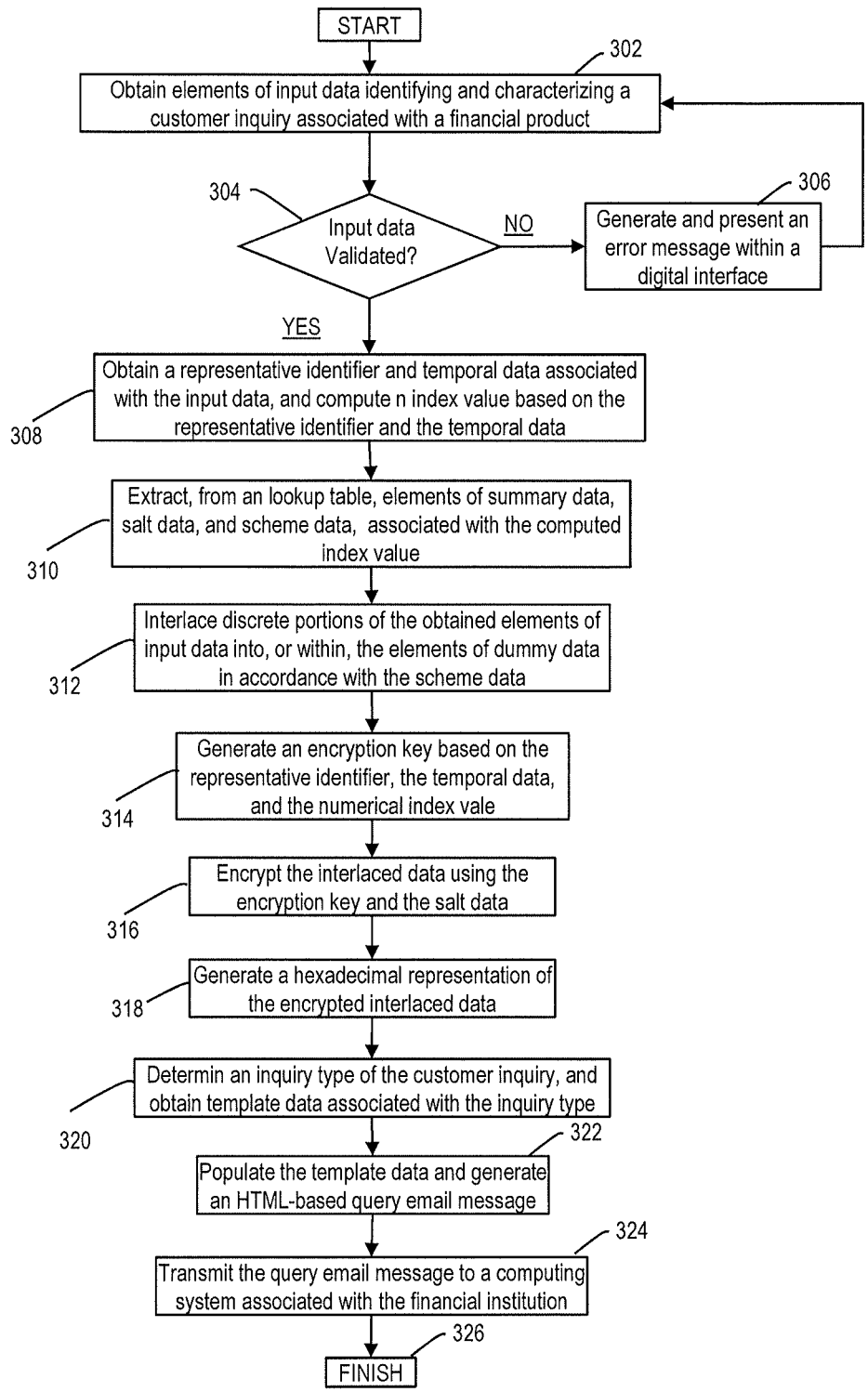
FIG. 3 is a flowchart of exemplary process for generating cryptographically secure, structured email messages associated with customer requests for third-party data, in accordance with some exemplary embodiments.

FIG. 3 is a flowchart of an exemplary process 300 for generating cryptographically secure, structured email messages associated with customer requests for third-party data, in accordance with disclosed exemplary embodiments. For example, a network-connected computing system or device operating within environment 100, such as client device 102, may perform one or more of the steps of exemplary process 300. Referring to FIG. 3, client device 102 may perform any of the exemplary processes described herein to obtain elements of input data identifying and characterizing a customer inquiry associated with a financial product (e.g., in step 302 of FIG. 3). As described herein, a representative of the financial institution, such as representative 101, may provision portions of the obtained input data to a digital interface presented by client device 102 (e.g., in response to interface elements of digital inquiry form 108 of FIG. 1A), and the elements of input data may include, among other things, information that identifies an inquiry type associated with the customer inquiry (e.g., one of the exemplary inquiry types described herein), a customer associated with the customer inquiry (e.g., a customer name), and the financial product (e.g., the account number of the credit card account described herein).

In some instances, client device 102 may perform any of the exemplary processes described herein to validate a format, structure, or composition of the obtained elements of input data (e.g., in step 304 of FIG. 3). For example, in step 306, the executed front-end application may validate the obtained elements of input data based on a determination that a structure or format of the obtained elements of input data corresponds to an expected structure or format (e.g., that the account number includes sixteen digits, that a first and last names of the customer include at least a threshold number of characters, such as two, etc.) and additionally or alternatively, that the composition of the obtained elements of input data corresponds to an expected composition (e.g., that none of the digits of the account number are out-of-range or include alphabetic characters, etc.).

If, for example, client device 102 were unable to validate a format, structure, or a composition of the obtained elements of input data (e.g., step 304; NO), client device 102 may perform any of the exemplary processes described herein to present an error message indicative of the failed validation within the digital interface (e.g., in step 306 of FIG. 3). Exemplary process 300 may then pass back to step 302, and client device 102 may await additional elements of input data provisioned by representative 101, as described herein.

Alternatively, if client device 102 were to validate successfully the format, structure, or composition of the obtained elements of input data (e.g., step 306; YES), client device 102 may perform any of the exemplary processes described herein to generate, or obtain, a representative identifier and elements of temporal data associated with the input data, and to compute a numerical index value based on the portions of the representative identifier and elements of temporal data (e.g., in step 308 of FIG. 3). As described herein, the representative identifier may include, among other things, an alphanumeric identifier assigned to the representative by the financial institution, a digital token or cryptogram having a predetermined structure or composition, or another elements or alphanumeric or cryptographic data that identifies the representative at FI computing system 130, and the elements of temporal data may include a time or date at which client device 102 received the elements of input data. Further, client device 102 may perform operations in step 308 that compute the numerical index value based on an application of an indexing process associated with a corresponding encryption process, such as an AEC-256-CBC or an AEC-256-GBM process, to the portions of the representative identifier and the elements of temporal data.

Client device 102 may perform any of the exemplary processes described herein to access one or more elements of a lookup (e.g., lookup table 126 of FIG. 1A), to identify a corresponding one of the elements of the lookup table that includes numerical index value, and to obtain elements of dummy data, salt data, and scheme data associated with the numerical index value from the identified elements of the lookup table (e.g., in step 310 of FIG. 3). The elements of dummy data may include unencrypted, and insensitive, elements of textual or alphanumeric content unrelated to the customer, the credit card account, or the customer inquiry (e.g., alphanumeric character strings of predetermined or various lengths) and the salt data may include a random or pseudo-random number or character string of predetermined length. Client device 102 may perform any of the exemplary processes described herein to interlace discrete portions of the obtained elements of input data into, or within, the elements of dummy data in accordance with a corresponding interlacing scheme or mechanism as specified by the scheme data, and to generate corresponding elements of interlaced input data (e.g., in step 312 of FIG. 3).

Client device 102 may perform any of the exemplary processes described herein to generate an encryption key based on an application of a key generation process associated with, and consistent with, the corresponding encryption process (e.g., the AEC-256-CBC or an AEC-256-GBM encryption process, etc.) to each, or a selected portion of, the representative identifier, the elements of temporal data, and the numerical index value (e.g., in step 314 of FIG. 3), and to encrypt all, or a selected portion of, the interlaced input data using the encryption key and the salt data and generate elements of encrypted interlaced data (e.g., in step 316 of FIG. 3). Further, in step 318 of FIG. 3, client device 102 may perform any of the exemplary processes described herein to generate a hexadecimal representation of the elements of encrypted interlaced data (e.g., by converting the alphanumeric characters within the now-encrypted interlaced data into hexadecimal), and that package the hexadecimal representation into portions of hexadecimal data.

In some instances, client device 102 may perform any of the exemplary processes described herein to determine an inquiry type associated with the customer inquiry based on the elements of input data, and to obtain elements of message template data characterizing a composition or layout of a message template appropriate to the determined inquiry type specified by element (e.g., in step 320 of FIG. 3). Client device 102 may perform any of the exemplary processes described herein to generate an HTML-based query email message based on the elements of message template data, and on the hexadecimal data, the representative identifier, and the elements of temporal data (e.g., in step 322 of FIG. 3). For example, in step 322, client device 102 may perform any of the exemplary processes described herein to populate the message template data with corresponding portions of the hexadecimal data (e.g., the hexadecimal representation of encrypted interlaced data), the representative identifier, in some instances, in some instances, the element of temporal data, e.g., by parsing the message template data to identify elements of placeholder data associated with the portions of the hexadecimal data 142, the representative identifier, and/or the elements of temporal data, and perform operations that populate the message template data by replacing the placeholder data elements of corresponding portions of the hexadecimal data, the representative identifier, and/or the temporal data 121.

As described herein, client device 102 may transmit the HTML-based query email message across network 120 to a computing system associated with the financial institution, such a FI computing system 130 (e.g., in step 324 of FIG. 3). Exemplary process 300 is then complete in step 326.

Figure 4:
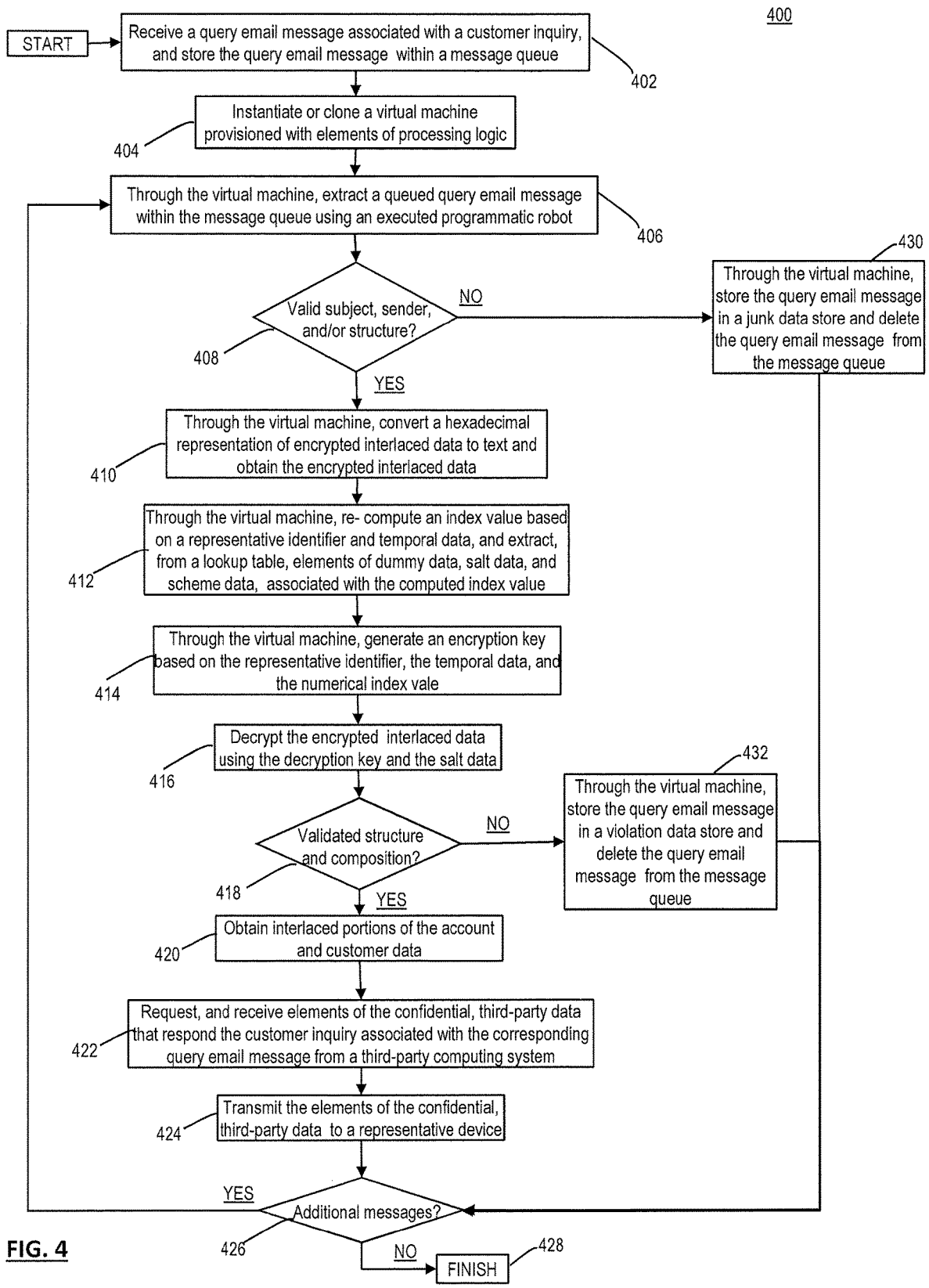
FIG. 4 is a flowchart of an exemplary process for managing email-based queries involving confidential third-party data using visualized programmatic robots, in accordance with some exemplary embodiments.

FIG. 4 is a flowchart of an exemplary process 400 for managing email-based queries involving confidential third-party data using visualized programmatic robots. For example, a network-connected computing system operating within environment 100, such as FI computing system 130, may perform one or more of the steps of exemplary process 400. Referring to FIG. 4, FI computing system 130 may receive a cryptographically secure, structured email message (e.g., a query email message) associated with a customer inquiry associated with elements of third-party data from a device of a representative of the financial institution (e.g., in step 402 of FIG. 4). As described herein, the email message may be structured in HTML format, and may include a hexadecimal representation of encrypted interlaced data (e.g., elements of account and customer data associated with the customer inquiry interlaced into elements of insensitive, dummy data and encrypted using a message-specific encryption key), a representative identifier of the representative, and in some instances, temporal data associated with customer inquiry. FI computing system 130 may also perform any of the exemplary processes described herein to store the query email message within a corresponding portion of a message queue (e.g., also in step 402 of FIG. 4).

FI computing system 130 may also perform any of the exemplary processes described herein to instantiate a virtual machine provisioned with elements of object information and elements of processing logic, and additionally, or alternatively, to clone a previously instantiated and provisioned virtual machine (e.g., in step 404 of FIG. 4). Further, and upon execution by FI computing system 130, one or more programmatic bots established by the instantiated or cloned virtual machine may access the message queue and extract a corresponding one of the queued query email messages (e.g., in step 406 of FIG. 4), and may perform any of the exemplary processes described herein to validate a subject or tagline of the corresponding query email message, a device that transmitted the corresponding query email message to FI computing system 130, and additionally, or alternatively, a layout or structure of the corresponding query email message (e.g., in step 408 of FIG. 4).

If, for example, the one or more programmatic bots established by the instantiated or cloned virtual machine were to validate successfully the subject or tagline of the corresponding query email message, the device that transmitted the corresponding query email message to FI computing system 130, and additionally, or alternatively, the layout or structure of the corresponding query email message (e.g., step 408; YES), the one or more programmatic bots established by the instantiated or cloned virtual machine may perform any of the exemplary processes described herein to access the hexadecimal representation of the encrypted interlaced data within the corresponding query email message, and to convert the hexadecimal representation to text and obtain the encrypted interlaced data (e.g., in step 410 of FIG. 4). Further, upon execution by FI computing system 130, one or more programmatic bots established by the instantiated or cloned virtual machine may perform any of the exemplary processes described herein to re-compute a numerical index value based on one or more portions the representative identifier and the temporal data associated with customer inquiry and to obtain, from an elements of a lookup table that includes the numerical index value, elements of dummy data, salt data, and scheme data (e.g., in step 412 of FIG. 4).

In some instances, and upon execution by FI computing system 130, one or more programmatic bots established by the instantiated or cloned virtual machine may perform any of the exemplary processes described herein to generate a decryption key based on the representative identifier, the temporal data, and the numerical index value (e.g., in step 414 of FIG. 4), to decrypt all, or a selected portion, of the encrypted interlaced data using the decryption key and the salt data (e.g., in step 416 of FIG. 4), and further, to validate a structure or composition of the now-decrypted elements of interlaced data (e.g., in step 418 of FIG. 4). If, for example, the one or more programmatic bots established by the instantiated or cloned virtual machine were to validate successfully that the structure and composition of the now-decrypted elements of interlaced data (e.g., step 418; YES), the one or more programmatic bots established by the instantiated or cloned virtual machine may perform any of the exemplary processes described herein to obtain the interlaced portions of the account and customer data from the now-decrypted elements of interlaced data based on the interlacing scheme or mechanism specified within the scheme data (e.g., in step 420 of FIG. 4).

Further, upon execution by FI computing system 130, one or more programmatic bots established by the instantiated or cloned virtual machine may perform any of the exemplary processes described herein to request, and receive elements of the confidential, third-party data that respond to, or resolve, the customer inquiry associated with the corresponding query email message from a third-party computing system across a secure, programmatic channel of communications (e.g., in step 422 of FIG. 4). FI computing system 130 may transmit the receive elements of the confidential, third-party data across network 120 to a device associated with the representative (e.g., in step 424 of FIG. 4). In some instances, the device of the representative may receive the elements of the confidential, third-party data from FI computing system 130, and may perform any of the exemplary processes described herein to present a graphical representation of portions of the confidential, third-party data within a digital interface. Upon execution by FI computing system 130, one or more programmatic bots established by the instantiated or cloned virtual machine may perform operations to parse the message queue and determine whether additional queued email query messages await processing (e.g., in step 426 of FIG. 4).

If, for example, the one or more programmatic bots established by the instantiated or cloned virtual machine were to determine that additional queued query email messages await processing (e.g., step 426; YES), exemplary process 400 may pass back to step 406, and the one or more programmatic bots established by the instantiated or cloned virtual machine may perform any of the exemplary processes described herein to extract an additional one of the additional queued query email messages. Exemplary process 400 is then complete in step 428

Referring back to step 408, the one or more programmatic bots established by the instantiated or cloned virtual machine were unable to validate the subject or tagline of the corresponding query email message, the device that transmitted the corresponding query email message to FI computing system 130, or the layout or structure of the corresponding query email message (e.g., step 408; NO), the one or more programmatic bots established by the instantiated or cloned virtual machine may perform any of the exemplary processes described herein to store the corresponding query email message within a junk data store and to the corresponding delete query email message from the from message queue (e.g., in step 430 of FIG. 4). Exemplary process 400 may then pass to step 426, and the one or more programmatic bots established by the instantiated or cloned virtual machine may determine that additional queued query email messages await processing.

Further, and referring back to step 418, if the one or more programmatic bots established by the instantiated or cloned virtual machine were unable to validate successfully that the structure and composition of the now-decrypted elements of interlaced data (e.g., step 418; NO), the one or more programmatic bots established by the instantiated or cloned virtual machine may perform any of the exemplary processes described herein to store the corresponding query email message within a violation data store, and to the corresponding delete query email message from the from message queue (e.g., in step 432 of FIG. 4). Exemplary process 400 may then pass to step 426, and the one or more programmatic bots established by the instantiated or cloned virtual machine may determine that additional queued query email messages await processing.

C. Exemplary Computing Architectures

Embodiments of the subject matter and the functional operations described in this specification, inquiry application 104, input analysis module 114, encryption module 122, message generation module 144, application programming interfaces (APIs) 154, 242, 252, and 254, queue management engine 156, virtualization engine 202, message selection engine 212, message validation engine 214, decryption engine 216, decomposition engine 218, inquiry engine 220, and query resolution engine 244, can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including the operations performed by the computing system, the programmatic software robot, and the computing device, may be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" (e.g., the client device, the FI computing system, the computing systems of the third-party processor, etc.) refer to data processing hardware and encompass all kinds of apparatus, devices, and machines for processing data, including, by way of example, a programmable processor such as a graphical processing unit (GPU), tensor processing unit (TPU), or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network, such as communications network 120 described herein.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks, such as communications network 120, include a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems described herein may perform operations that establish and maintain one or more secure channels of communication across the communications network (e.g., communications network 120), such as, but not limited to, a transport layer security (TSO) channel, a secure socket layer (SSL) channel, or any other suitable secure communication channel.

The exemplary computing systems or environments described herein can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

What is claimed is:

1. An apparatus, comprising:
   a communications interface;
   a memory storing instructions; and
   at least one processor coupled to the communications interface and to the memory, the at least one processor being configured to execute the instructions to:
      receive, via the communications interface, message data associated with an inquiry from a first computing system, the message data comprising encrypted interlaced data, an identifier, and temporal data;
      determine that a structure of the message data corresponds to an expected structure, and based on the determination that the structure of the message data corresponds to the expected structure, perform operations that generate a decryption key based on at least one of the identifier or the temporal data, and that decrypt the encrypted interlaced data using the decryption key, the decrypted interlaced data comprising inquiry data characterizing the inquiry and dummy data;

based on a portion of the decrypted interlaced data, transmit, via the communications interface, a request for a response to the inquiry to a second computing system;

receive, via the communications interface, the response to the inquiry from the second computing system; and transmit, via the communications interface, at least a portion of the response to the first computing system, the first computing system being configured to present the portion of the response within a digital interface.

2. The apparatus of claim 1, wherein the at least one processor is further configured to execute the instructions to:

extract the inquiry data characterizing the inquiry from a portion of the decrypted interlaced data; and transmit, via the communications interface, at least a portion of the inquiry data to the second computing system, the second computing system being configured to generate the response based on the portion of the inquiry data.

3. The apparatus of claim 2, wherein the at least one processor is further configured to execute the instructions to:

determine that a structure or a composition of the extracted inquiry data corresponds to an expected structure or composition; and based on the determination that the structure or composition of the extracted inquiry data corresponds to the expected structure or composition, transmit at least the portion of the inquiry data to the second computing system via the communications interface.

4. The apparatus of claim 1, wherein the at least one processor is further configured to execute the instructions to:

compute an index value based on the at least one of the identifier or the temporal data;

obtain textual content and salt data associated with the index value from the memory.

5. The apparatus of claim 4, wherein the at least one processor is further configured to execute the instructions to:

generate the decryption key based on the index value and the at least one of the identifier or the temporal data; and decrypt the encrypted interlaced data using the decryption key and salt data, the salt data comprising an alphanumeric character string associated with the index value.

6. The apparatus of claim 4, wherein:

the decrypted interlaced data comprises one or more elements of the textual content and inquiry data characterizing the inquiry;

the at least one processor is further configured to execute the instructions to execute the instructions to:

obtain, from the memory, elements of scheme data associated with the index value, the scheme data characterizing a sequential disposition of the elements of textual content and portions of the inquiry data within the decrypted interlaced data; and based on the scheme data, extract the inquiry data from the elements of textual content of the decrypted interlaced data; and transmit, via the communications interface, at least a portion of the inquiry data to the second computing system, the second computing system being configured to generate the response based on the portion of the inquiry data.

7. The apparatus of claim 1, wherein:

the message data comprises a hexadecimal representation of the encrypted interlaced data;

the at least one processor is further configured to execute the instructions to decode the hexadecimal representation and obtain the encrypted interlaced data.

8. The apparatus of claim 1, wherein the at least one processor is further configured to execute the instructions to:

store the message data within a portion of the memory associated with a message queue; and based on the received response, perform operations that delete the message data from the portion of the memory.

9. The apparatus of claim 8, wherein the at least one processor is further configured to execute the instructions to:

determine that the structure of the message data fails to correspond to the expected structure; and based on the determination that the structure of the message data fails to correspond to the expected structure, perform the operations that delete the message data from the portion of the memory.

10. The apparatus of claim 8, wherein the at least one processor is further configured to execute the instructions to:

perform operations that instantiate a virtual machine, the virtual machine being provisioned with elements of processing logic; and execute the virtual machine in accordance with the elements of processing logic, the executed virtual machine performing operations consistent with the elements of processing logic that obtain the message data from the portion of the memory, that generate the decryption key based on at least one of the identifier or the temporal data, and that decrypt the encrypted interlaced data using the decryption key.

11. A computer-implemented method, comprising:

receiving, using at least one processor, message data associated with an inquiry from a first computing system, the message data comprising encrypted interlaced data, an identifier, and temporal data;

determine that a structure of the message data corresponds to an expected structure, and based on the determination that the structure of the message data corresponds to the expected structure, performing operations, using the at least one processor, that generate a decryption key based on at least one of the identifier or the temporal data, and that decrypt the encrypted interlaced data using the decryption key, the decrypted interlaced data comprising inquiry data characterizing the inquiry and dummy data;

based on a portion of the decrypted interlaced data, transmitting, using the at least one processor, a request for a response to the inquiry to a second computing system;

receiving, using the at least one processor, the response to the inquiry from the second computing system; and transmitting, using the at least one processor, at least a portion of the response to the first computing system, the first computing system being configured to present the portion of the response within a digital interface.

12. The computer-implemented method of claim 11, further comprising:

extracting, using the at least one processor, the inquiry data characterizing the inquiry from a portion of the decrypted interlaced data; and transmitting, using the at least one processor, at least a portion of the inquiry data to the second computing system, the second computing system being configured to generate the response based on the portion of the inquiry data.

13. The computer-implemented method of claim 12, further comprising:
   determining, using the at least one processor, that a structure or a composition of the extracted inquiry data corresponds to an expected structure or composition; and
   based on the determination that the structure or composition of the extracted inquiry data corresponds to the expected structure or composition, transmitting, using the at least one processor, at least the portion of the inquiry data to the second computing system via the communications interface.

14. The computer-implemented method of claim 11, further comprising:
   computing, using the at least one processor, an index value based on the at least one of the identifier or the temporal data;
   obtaining, using the at least one processor, textual content and salt data associated with the index value from the memory.

15. The computer-implemented method of claim 14, further comprising:
   generating, using the at least one processor, the decryption key based on the index value and the at least one of the identifier or the temporal data; and
   decrypting, using the at least one processor, the encrypted interlaced data using the decryption key and salt data, the salt data comprising an alphanumeric character string associated with the index value.

16. The computer-implemented method of claim 11, wherein:
   the message data comprises a hexadecimal representation of the encrypted interlaced data;
   the computer-implemented method further comprises, using the at least one processor, decoding the hexadecimal representation and obtaining the encrypted interlaced data.

17. The computer-implemented method of claim 11, further comprising:
   storing, using the at least one processor, the message data within a portion of the memory associated with a message queue; and
   based on the received response, performing operations, using the at least one processor, that delete the message data from the portion of the memory.

18. The computer-implemented method of claim 17, further comprising:
   determining, using the at least one processor, that the structure of the message data fails to correspond to the expected structure; and
   based on the determination that the structure of the message data fails to correspond to the expected structure, performing the operations, using the at least one processor, that delete the message data from the portion of the memory.

19. The computer-implemented method of claim 17, further comprising:
   performing operations, using the at least one processor, that instantiate a virtual machine, the virtual machine being provisioned with elements of processing logic; and
   executing the virtual machine, using the at least one processor, in accordance with the elements of processing logic, the executed virtual machine performing operations consistent with the elements of processing logic that obtain the message data from the portion of the memory, that generate the decryption key based on at least one of the identifier or the temporal data, and that decrypt the encrypted interlaced data using the decryption key.

20. A tangible, non-transitory computer-readable medium storing instructions that, when executed by at least one processor, cause the at least one processor to perform a method, comprising:
   receiving message data associated with an inquiry from a first computing system, the message data comprising encrypted interlaced data, an identifier, and temporal data;
   determining that a structure of the message data corresponds to an expected structure and based on the determination that the structure of the message data corresponds to the expected structure, performing operations that generate a decryption key based on at least one of the identifier or the temporal data, and that decrypt the encrypted interlaced data using the decryption key, the decrypted interlaced data comprising inquiry data characterizing the inquiry and dummy data;
   based on a portion of the decrypted interlaced data, transmitting a request for a response to the inquiry to a second computing system;
   receiving the response to the inquiry from the second computing system; and
   transmitting at least a portion of the response to the first computing system, the first computing system being configured to present the portion of the response within a digital interface.

* * * * *